United States Patent [19]
Littleford et al.

[11] Patent Number: 6,076,739
[45] Date of Patent: Jun. 20, 2000

[54] INDOOR AIR QUALITY CONTROLLED FOGGERS

[75] Inventors: Wayne Scott Littleford, Nepean, Canada; Thomas Heede, Wilton, Conn.

[73] Assignee: Enviro-Energy Products, Inc., Nepean, Canada

[21] Appl. No.: 09/052,935

[22] Filed: Apr. 1, 1998

[51] Int. Cl.[7] .............................. B01F 3/02; G05D 21/00
[52] U.S. Cl. ..................... 236/44 R; 165/222; 261/78.1
[58] Field of Search ................. 236/44 B, 44 R; 165/249, 250, 225, 222; 62/309; 261/DIG. 15, 78.1

[56] References Cited

U.S. PATENT DOCUMENTS

| | | | |
|---|---|---|---|
| 2,107,268 | 2/1938 | Avery et al. | 165/250 |
| 4,367,787 | 1/1983 | Bradshaw | 165/222 |
| 4,627,568 | 12/1986 | Lortie et al. | 236/44 B |

*Primary Examiner*—William Wayner

[57] ABSTRACT

A fogger array, permanent wash down filters, and a digital controller for use in a heating, ventilating and air conditioning system having sensors and controls, the heating, ventilating and air conditioning system having a return air and a supply air plenum, the return air plenum is baffled to the outside, an outside air source with baffles, a mixed air plenum, the mixed air plenum connected by baffles to the outside air source and the return air plenum, characterized by the fogger array located in the mixed air plenum, the permanent wash down filters located in the supply air plenum proximate the mixed air plenum, the permanent wash down filters located in the supply air plenum proximate the fogger array, the digital controller controlling the sensors and controls to the heating, ventilating and air conditioning system and fogger array.

1 Claim, 9 Drawing Sheets

INDOOR AIR QUALITY CONTROLLED FOGGERS

BACKGROUND OF THE INVENTION

This invention is in the field of conditioning mixed exhaust air and outdoor air in a heating, ventilation and air conditioning system or a 100% fresh air conditioner serving a single temperature control zone.

More particularly the invention relates to the use of a fogger assembly supporting an array of foggers disposed in the air mixing plenum in which exhaust air and outdoor air are mixed as supply air to a typical heating ventilating air conditioning system. The invention also relates to the use of a fogger assembly supporting an array of foggers disposed proximate the inlet of 100% fresh air conditioner serving a single temperature control zone. The fogger array is controlled by a digital controller such as a microprocessor or microcomputer connected to sensors and controlling the air and water to the fogger array. The digital controller also controls dampers and valves in the heating, ventilation and air conditioning system or 100% air conditioner serving a single temperature control zone. A series of wash down permanent air filters are located in the supply air path adjacent the fogger array. The series of wash down permanent air filters provide 65% or better filtration specified for compliance with American Society of Heating, Refrigeration and Air Conditioning Engineers Indoor Air Quality Standards 62-1989. The invention may be designed to refit existing systems or applied in new systems.

Indoor air quality has become one of the leading occupational and environmental health issues. Synthetic materials, modern office equipment (photocopiers, laser printers, computers), cleaning products and introduction to outdoor air pollution via supply inlets of heating, ventilating and air conditioning system all contribute to indoor air contamination.

Physical symptoms commonly attributed to indoor air quality problems include headache, fatigue, shortness of breath, sinus congestion, cough, sneezing, skin irritation, dizziness, nausea and eye, nose and throat irritation. Some individuals may be particularly susceptible to the effects of indoor air contaminants, for instance allergic or asthmatic individuals, people with respiratory disease, people whose immune systems are suppressed due to chemotherapy, radiation therapy, and other assorted diseases.

(A) Space-Pronagated Ozone

Space propagated ozone is a specific indoor air quality pollutant, when in excess of 0.1 ppm establishes the legal exposure limit. (Occupational Safety and Health Act, 29 CFR 1910.1000 Table Z-1, C-12). Prolonged exposure to ozone at levels in excess of 0.1 ppm is reported to produce permanent respiratory impairment which is what all government agencies are concerned with in defining attainment standards for ambient air quality.

Space propagated ozone originates from desktop electronics, fax machines, copiers etc. Most modern offices depend on electronic equipment systems and these produce ozone ($O_3$). Even though most of this equipment (domestic origin) is designed and certified to emit 0.1 ppm under an Air Conditioning and Refrigeration Institute protocol, the combination of dry air and equipment packing allows space-propagated ozone accumulations to rise, over a period of hours, to reach debilitating levels.

Mechanical rooms are designed nowadays with little to no outside air circulation. Electrical equipment running continuously produces an even greater amount of ozone ($O_3$) caused by electrical contacts, rotors etc. arcing. Because most of the buildings are pressurized, the contaminant air in the mechanical rooms usually gets drawn out of the mechanical rooms by doors opening or through cracks and breaks and is drawn into the return systems.

The American Society of Heating, Refrigerating and Air Conditioning Engineers dictates ozone's concentrations of between 0.02 to 0.2 ppm related to building relative humidity and quantifies space-propagated ozone formation at 0.08 ppm within 8 air change space occupancy parameters. Ozone ($O_3$) is a heavy gas. Ozone ($O_3$) molecular weight is 48. The molecular weight of air is only 29. Hence, space-propagated ozone purges sluggishly until enough cycles-of-concentration build up ozone ($O_3$) level to convey the gas. Even with increased ventilation and increased outside air rates the space-propagated ozone problem persists.

(B) Sources and Factors Affecting Indoor Air Quality

Indoor environment results from the interactions of the physical layout of the site, the outdoor climate, the building's heating, ventilating, and air conditioning systems, potential contaminant sources, and the building occupants. Some of the sources of factors affecting indoor air quality are:

Carbon Monoxide

Carbon Monoxide is a colourless, odourless, toxic gas that is a product is incomplete combustion. Pollution results when combustion gases are not properly exhausted or are reintroduced into the building. Most parking garages are equipped with carbon monoxide sensors that switch on the ventilation systems when levels get above a pre-set point. Symptoms of low-level exposure include headaches, nausea, fatigue and flu like symptoms. These effects are not likely to be observed below about 25 ppm. In most buildings levels will be below 5 ppm.

Formaldehyde

Formaldehyde is a colourless gas with a pungent odour. Building materials, especially new ones, are the most common source of the gas, carpets, particleboard, furniture, and fabrics often contain cleaning fluids or adhesives with formaldehyde in them. Slow off-gassing from these building materials can result in concentration of formaldehyde that affect building occupants.

Particulates

Particulates can be both solid or liquid matter. Dust, fumes, smoke, and organisms such as viruses, pollen grains, bacteria and fungal spores are examples of solid particulate matter. Both synthetic and natural fibers (e.g. glass wool fibers) that were used in building insulation may cause problems. Insulation that is in poor condition and located near areas where people work or beside air vents may indicate potential insulation particulate problem. Particles come from both indoor and outdoor sources and can be drawn into the building through infiltration and air intakes. The mechanical ventilation system itself may be a source of particulate matter (e.g. scale, rush, disinfectants, biological growth in ducts and pipe insulation). Particulates can cause allergic reactions, dry eyes, contact lens problems, nose and throat problems, skin irritation, coughing, sneezing and respiratory difficulties.

Volatile Organic Compounds

There are several thousand chemicals, synthetic and natural, that can be called volatile organic compounds. All buildings contain a large variety of chemical sources such as plastics, cigarette smoke, floor wax, furniture, building materials, liquid process printers or copiers. The effect that each of these chemicals product varies with the particular chemical. Most chemicals will cause irritation if the concentrations in the air are high enough.

Typical Mixed Air Heating, Ventilation and Air Conditioning System (A) The mixed air heating, ventilation and air conditioning system shown in FIG. 1 is designed to supply conditioned air to a single zone or to some other system. The quantity and quality of this air has fixed parameters determined by the space requirements. Air passing through the equipment gains and loses heat by contact with the heat transfer surfaces and by mixing with air of another condition. Some of these mixtures are intentional, as at the outdoor air intake. Others are results of the physical characteristics of a particular component as when untreated air passes between the fins of a coil without contact. It is essential that all mechanical mixture of treated and untreated air be thorough for maximum performance of heat transfer surfaces and uniform temperatures in the air stream.

(B) Mixing of the air is obtained by a mixing box with baffles arranged to direct the two air streams to impinge on each other in multiple jets at right angles of each other creating the turbulence required to mix them thoroughly. Outside air and return air dampers are sequenced and arranged to minimize stratification and achieve proper mixing. The outside air damper and the return air damper are modulated to ensure proper amount of outdoor air is brought into the building when the system is running, and that the outside air damper is tightly closed on shutdown to minimize outdoor air leakage.

(C) The overall performance of air filters, regardless of type or size selected, must meet or exceed American Society of Heating, Refrigerating and Air Conditioning Engineers standards 52-76 (Ref. 8). A typical construction of the filters consists of continuous filament glass fibres with a light coating of viscosine adhesive applied to the air entering side.

(D) Heating coil is used whenever the mixed air temperature starts to drop lower than a set point temperature usually 55° F. to maintain a constant temperature in the space. The purpose of the central system is to distribute conditioned air with gradual changes in temperatures and moisture content to satisfy the air-conditioning load.

(E) Cooling coil is used to remove the sensible and latent heat from air. In a comfort installation, with 25% or less of outdoor air a small internal latent load and only temperature controls, dew point of the air mixture leaving the coil will readily satisfy room conditions.

(F) The supply fan blows directly forward or upward, the best arrangement may be a double width, double inlet fan. When the air is to be delivered at right angles to the flow of air through the equipment, a single inlet fan should be used. These arrangements will permit a direct flow of air from the fan wheel into the supply duct without abrupt change in direction with accompanying loss in efficiency.

(G) Return fan generally is essential for proper operation. The main function is to provide a positive return and exhaust stream from the work space, particularly when mixing dampers are used to permit cooling with outdoor air in intermediate seasons.

(H) For comfort humidifier installations where close control is not essential, moisture can be added to the air by pan-type humidifiers with a heating coil, by grid-steam humidifiers, and in some instances, mechanical atomizers. Location of this equipment is important to prevent stratification of moist air in the system.

The inventors, in recognition of all the above, have invented an engineered method to eliminate hazardous and noxious volatile organic compounds from the indoor re-circulated air stream, at the same time reduce operating costs to the equipment such as (1) During spring and fall the indoor air quality controlled fogger is able to reduce the need of starting the mechanical cooling (chiller) by providing evaporative cooling due to the humidification.

(2) Indoor air quality controlled foggers will allow the elimination of the building's existing humidifiers. This may result in lower energy demands from the heating system which could be as high as 10%.

(3) The elimination of any preheat coil which would reduce (1) heating costs, (2) fan resistance, which in turn lower the electrical load on the fan.

IN THE DRAWINGS

DESCRIPTION OF THE INVENTION

Figure 1:
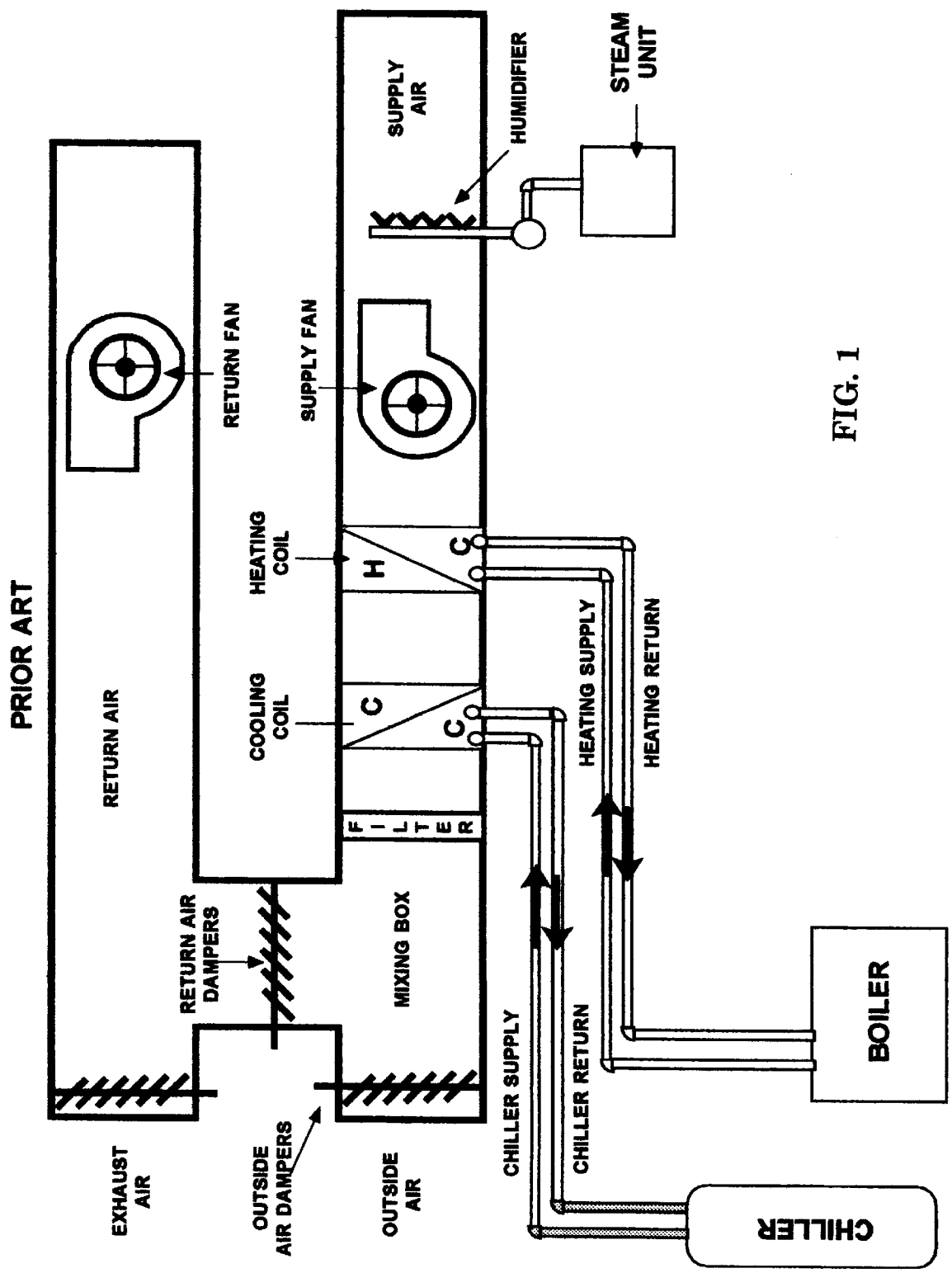
FIG. 1 is a schematic drawing of a typical mixed air heating ventilating, air conditioning unit currently in use.

To fully understand the indoor air quality controller fogger invention a step-by-step procedure has been developed to simplify and identify the method or process which is as follows:

Step 1

A building Energy Analysis has to be performed to determine the building design parameters. This is accomplished by estimating energy use and operating cost for an office building (the modified bin method) as dictated by American Society of Heating, Refrigerating and Air Conditioning Engineers 1985 Fundamentals SI Edition.

The modified bin method has the advantage of allowing off-design calculations by use of diversified, rather than peak load values to establish the load as a function of outdoor dry bulb temperature. The modified bin method also allows the incorporation of a heating, ventilating and air-conditioning secondary system and plant equipment effects into the energy calculations. This approach permits the user to predict more accurately effects such as reheat and heat recovery that can only be assumed with the degree day or conventional bin methods.

In the modified bin method average solar gain profiles, average equipment and lighting use profiles and cooling load temperature difference values are used to characterize the time-dependent diversified loads. The cooling load temperature differences approximate the transient effects of building mass. Time dependencies resulting from scheduling are averaged over a selected period, or multiple calculation periods are established. The duration of a calculation period determines the number of bin hours included in it. Normally, two calculation periods representing occupied and unoccupied hours are sufficient, although any number can be used.

Loads resulting from solar gains through glazing are calculated by determining a weighted-average solar load for a summer and a winter day (each being of average cloudiness and having average solar conditions), and then establishing a linear relationship of this solar load as a function of outdoor ambient temperature. When the outdoor ambient temperature exceeds the room temperature the effect of heat transfer through sunlit roofs and walls is included in the transmission load by averaging the cooling load temperature differences and applying corrections for deviations from the cooling load temperature differences reference opaque surfaces is neglected when the outdoor ambient temperature is below room temperature.

Once a total load profile is determined as a function of outdoor ambient temperature for the occupied and unoccupied periods, the performance of the heating ventilating air conditioning system is computed by calculating the heating and cooling coil loads. Then the annual energy consumption at the coils is determined using bin hour weather data. Finally, the annual plant energy consumption is calculated using boiler and chiller part-load performance model. To summarize the above statement we ask:

(1) What type of building is it?
(Office tower, two storey, one storey warehouse etc.)
(2) Where is the building located?
(Ottawa, Toronto, Washington etc.)
(3) What is the summer design load?
(4) What are the summer outside design conditions?
(Dry bulb temperature, wet bulb temperature and percent possible sunshine).
(5) Inside design conditions?
(Occupied hours, unoccupied hours, humidity ratio, setbacks, no cooling coil used).
(6) What is the winter design load?
(7) What is the winter outside design condition?
(Dry bulb temperature, wet bulb temperature and percent possible sunshine).
(8) What is the building physical data?
(Gross floor area, net conditioned area, perimeter depth, interior space area, perimeter space area, wall area, glass area, wall type, roof type.)
(9) What is the internal load and schedules?
(Lights, equipment, people and the hours occupied and unoccupied).
(10) What type of ventilation?
(How much outside air filtration, how much air changes.)
(11) What type of air distribution system is it? What is the design supply air temperature? What is the design power?
(12) Identify primary equipment and energy consumption.
(Such as chiller, chiller pump, boiler, boiler pump, cooling tower, compressor).

Step 2

Because of the wide-ranging and constantly changing internal and external factors that determines thermal loads on commercial and industrial buildings, frequent evaluation is needed to obtain reasonably accurate estimates of annual energy consumption. Detailed simulation methods allow the engineer to account for the effect of these changing conditions and system complexities on the estimated energy usage.

To apply these methods a mathematical model of the building and its energy systems must be prepared. This model will normally consist of mathematical representations of:

(1) the thermal behaviour of the building structure;
(2) the thermodynamic behaviour of the air-conditioning delivery system;
(3) a mathematical relationship for load vs. energy requirements of the primary energy conversion equipment.

Usually, each model is formulated so that certain "input" quantities allow calculation of "output" quantities.

Step 3

The overall modelling strategy refers to the sequence and procedures needed to design the indoor air quality controlled fogger into the building system.

The indoor air quality controlled fogger design starts with the psychrometric chart analysis of the winter and spring/fall design conditions. Once the design parameters are noted we now can determine the fogging array.

A fogger produces a four to five square foot pattern across 500 FPM air handler flow, using only 5 SCFM of compressed air, entraining about 500 CFM of return air for each SCFM of compressed primary air injected and intimately mixing these primary and induced secondary air flow components at point of origin, within the foggers' "gap".

Figure 4:
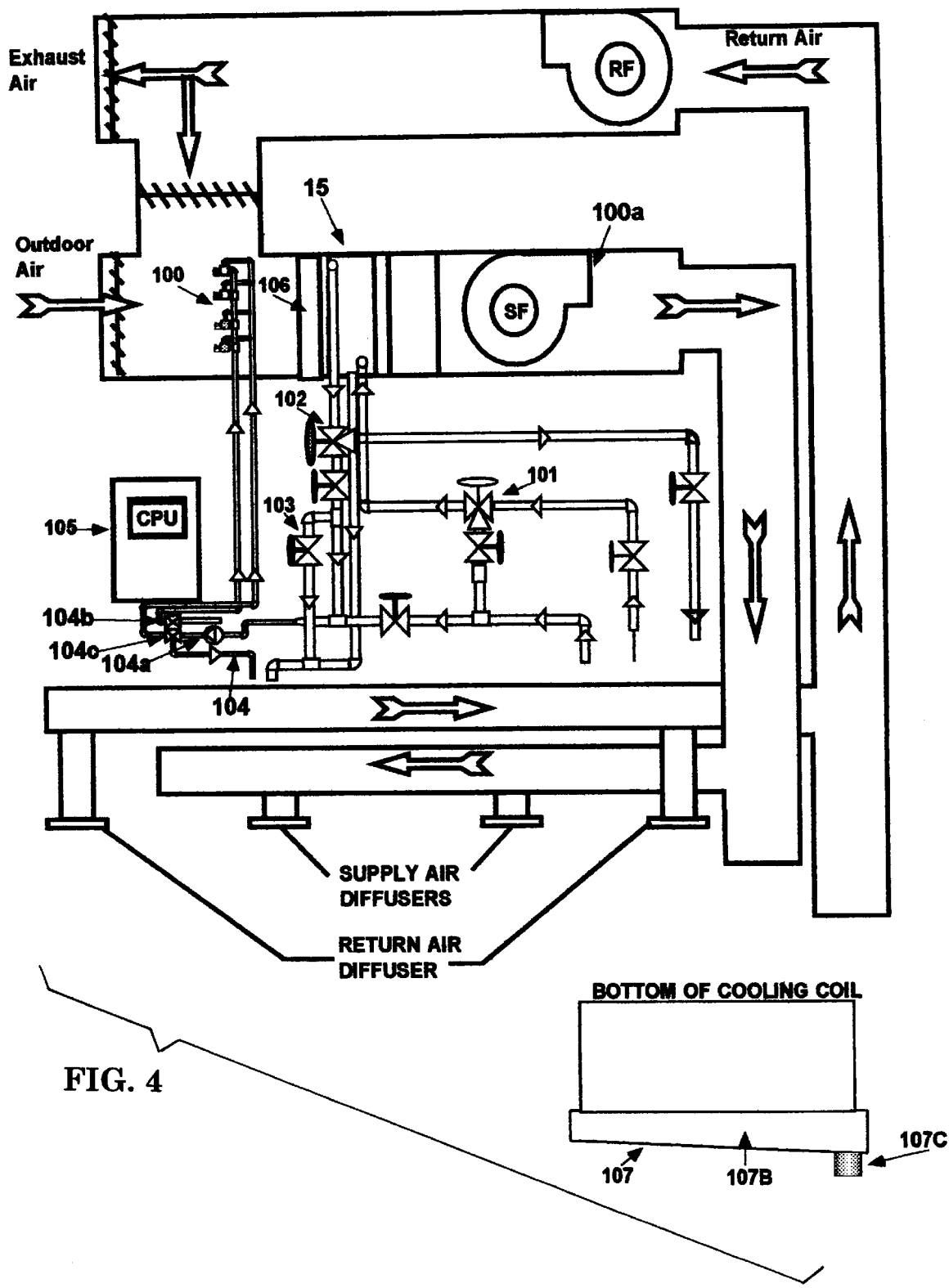
FIG. 4 is a representation of a mixed heating ventilating air conditioning system with indoor air quality controlled foggers, a bank of high efficiency wash down filters and a digital controller.

Within a 5 SCFM of primary air are millions of tiny water pressure atomized droplets which have been sheared and entrained within the jet stream. What leaves the fogger orifice, jetted at the acoustic velocity are droplets and compressed air shock wave pulses. The warm return air coming from the work space supplies the heat source for atmospheric pressure and temperature flash-cooling evaporation of the fog droplets. The foggers turning mechanism shown in FIG. 4 provides the critical pattern control so that ultra fine water droplets (i.e., 10 micron particles) mix within the airflow. Fog patterns must be carefully engineered, and fully controlled. Pattern control is achieved by "turning" the foggers with respect to each other and the actual turbulence encountered in bringing the system on-line.

While the general rule of compressed air consumption obeys the industrial standard of ⅛ SCFM per atomized water pound, the need for quick-flash and distribution control requires higher secondary air entrainment and calculable incremental increases in compressed air pressure and consumption for some of the foggers within a given array.

Figure 2:
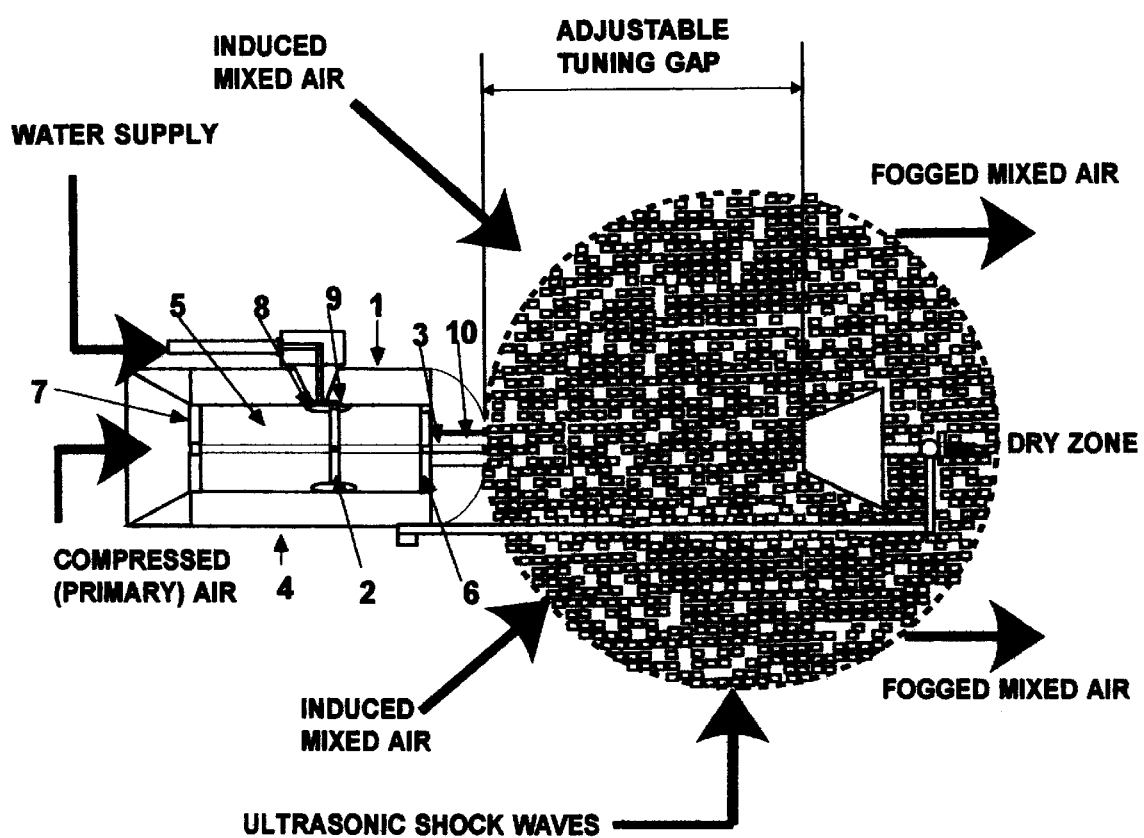
FIG. 2 is a representation of the fogger dynamics of an individual fogger of the type used in a fogger array.

A fogger, shown in FIG. 2, is a ballistic type compressed air expander which discharges compressed air at the acoustic velocity from the fogger's orifice. Foggers of the ballistic type compressed air expander can be obtained from Turbo-Fog Systems, Inc., 130 Gun Club Road, Stamford, Conn. 06903 U.S.A. The air expander (1) is an engineered orifice (2) and its long narrow drilled air passage length is at least six times the orifice diameter through which the compressed air is forced by a high inlet pressure on one end and atmospheric pressure at the other. This means at high velocity, pulsating airflow stream is discharged from the fogger's orifice (3) whenever the inlet pressure is at least 30 psig to create a Mach 1 exit velocity. As the inlet pressure increases so does the exit velocity.

The fogger's ballistic type orifice (2) is engineered for insertion into a universal body (4). When the ballistic type orifice (2) is inserted into the body (4), it becomes partially water jacketed by the agitator chamber (5) along its length. The water jacket (8) is maintained at a controlled pressure, less than equal to the compressed air pressure. Front seals (6) and rear seals (7) separate the compressed air inlet pressure from the water jacket (8) which allows only the water feed holes (9) to interconnect the water jacket (8) and compressed air pressure path at the common pressure point, through an agitation chamber (10) pressurized to equilibrium when the compressed air has been allowed to expand to the acoustic velocity choke-point. This assures a standing shock wave and resulting pulsating air flow upon which fog propagation is dependent.

The foggers also in a bigger part act as an evaporative cooler which helps reduce the use of mechanical cooling.

In a hot environment, where ambient heat control is difficult or impractical cooling is accomplished by passing below skin air temperature over the body. Evaporative coolers are suited to the purpose and the performance of evaporative cooling is directly related to climate conditions. The entering wet bulb temperature governs the final dry bulb temperature of the air discharged from an evaporative cooler. The capacity of the evaporative cooler is determined by how much the dry bulb temperature exceeds the wet bulb temperature. The maximum reduction in dry bulb temperature is the difference between the entering air dry and wet bulb temperatures. If the air is cooled to the wet bulb temperature, it becomes saturated and the process is 100% effective. System effectiveness is the depression of the dry bulb temperature of the air leaving the apparatus divided by the difference between the dry and wet bulb temperatures of the entering air.

Evaporative cooling performs a good air cleaning cycle, removing particulate and gaseous contaminants. Separation is largely a result of the impingement of particles on a wetted surface such as the fins of a cooling coil or media.

Step 4

When designing a heating, ventilating air conditioning system utilizing digitally controlled foggers and system, a series of wash-down permanent air filters (106) matching those specified for compliance with American Society of Heating, Refrigerating and Air Conditioning Engineers Indoor Air Quality Standards 62-1989, 65% efficiency or better filtration are located in the supply air plenum (100a) proximate the fogger array (100) as shown in FIG. 4. The efficiency of a filter is measured in accordance with procedures described in American Society of Heating, Refrigerating and Air Conditioning Engineers Standards 52-76 or other industry-accepted standards. American Society of Heating, Refrigerating and Air Conditioning Engineers Standards 52-76 specifies a challenge agent with a broad spectrum of particle size, typical of atmospheric dust. When describing high-efficiency filters industry standards usually refer to a di-octyl-phthalate test, where the challenge agent has a fairly narrow particle size distribution, around 0.3 micron diameter. In reviewing filter manufacturers' catalogues there are few references to filters specifically aimed at the health care market. Rather, such applications are left to the engineer to address using "American Society of Heating, Refrigerating and Air Conditioning Engineers efficiency filters" as appropriate to the required filtration task. Filtering incoming air permits extended operation between equipment cleanings, and tends to reduce maintenance costs. A bonus effect is the reduction in dust accumulation within the conditioned space.

Step 5

Figure 3:
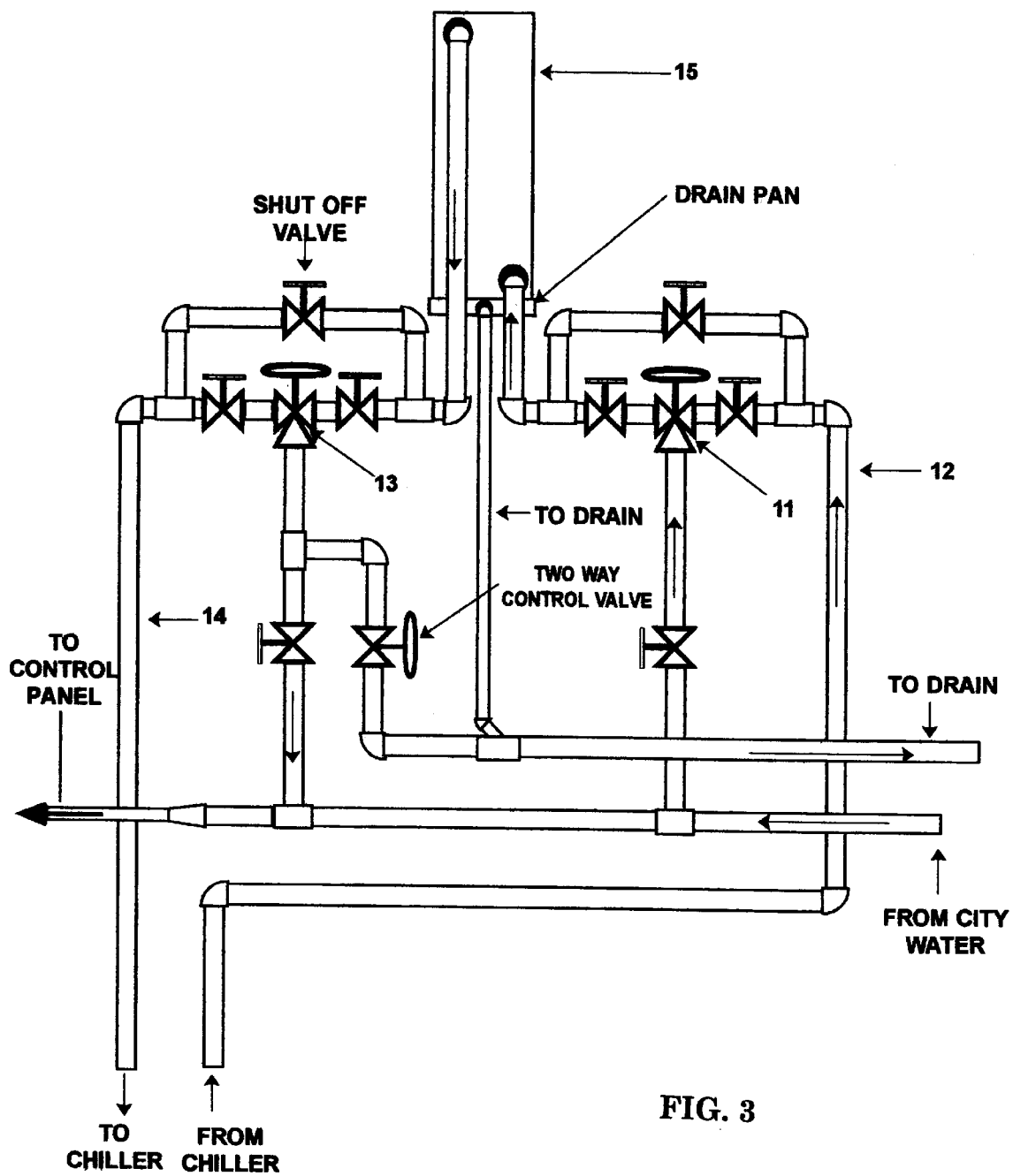
FIG. 3 is a drawing of added chilled water control valves which would be added to a conventional heating ventilating air conditioning unit when a bank of high efficiency wash down filters is substituted for current filters.

After the cooling coil design conditions have been determined (i.e. cooling load) and fluid flow (gallons per minute), two three-way automatic control valves (11) and (13) can be incorporated into the existing chilled water piping system, one control valve (11) installed on the chilled water supply line (12), one control valve (13) installed on the chilled water return line (14) as shown in FIG. 3. The control valves (11) and (13) are installed on the chilled water lines (12) and (14) to facilitate the use of cold city water pumped through the cooling coil (15) during the off season periods (fall, winter, spring). The cooling coil (15) will run year round when the system is in the occupied mode to condense the saturated mixed air produced by the foggers.

Step 6

The automatic control system modulates stages or sequences of the equipment capacity to meet load requirements and provides safe operation of the equipment. The heating, ventilation and air conditioning system with indoor air quality controlled fogger can use pneumatic, mechanical, electrical or electronic control devices pending on existing building criteria and implies that human intervention is limited to starting and stopping equipment and adjusting control set points. The control system performance in an indoor air quality controlled fogger application is evaluated in terms of speed of response and stability. A stable control loop will keep the controlled variable near set point while avoiding long-term oscillations. A control loop with a fast speed of response quickly responds to process disturbances. The requirements of accuracy, speed and stability are often contradictory (i.e. a change made in one of the component parameters could adversely affect others). Hence, the performance level of such systems must be selected to suit the application and must be evaluated in terms of control, comfort and energy conservation.

FIG. 4 shows the state-of-the-art indoor air quality controlled fogger incorporated into a typical heating, ventilating air control system. The components which constitute the invention in its entirety are numerically identified in the mentioned schematic. The array of foggers (100) is positioned in the mixed air stream and is sized with respect to the cross sectional area to ensure maximum mixture of the fog jet stream to the mixed air stream. A three-way control valve (101) is located on the chilled water supply to switch mechanical cooling (chiller) to city water cooling determined by the outside air temperature. A three-way control valve (102) is located on the chilled water return circuit to switch from mechanical cooling to city water cooling at the same time and intervals as the control valve (101) on the chilled water supply. A two-way control valve (103) is located in the chilled water return to automatically open to drain when returned city water is not needed for foggers (100) or others. Piping (104), pumps (104a), an air solonoid valve (104b) and water solonoid valve (104c) are needed to control both the compressed air and water going to the foggers. A central processing unit or a control panel (105) automatically controls the foggers (100), valves (104b), temperatures and flows. A bank of high efficiency wash down filters (106) aids in capturing any large particulate such as dust. Proper slopes (107) in the cooling coil drain pan (107b) ensure no water is left in the drain pan (107c) to foul.

Figure 5:
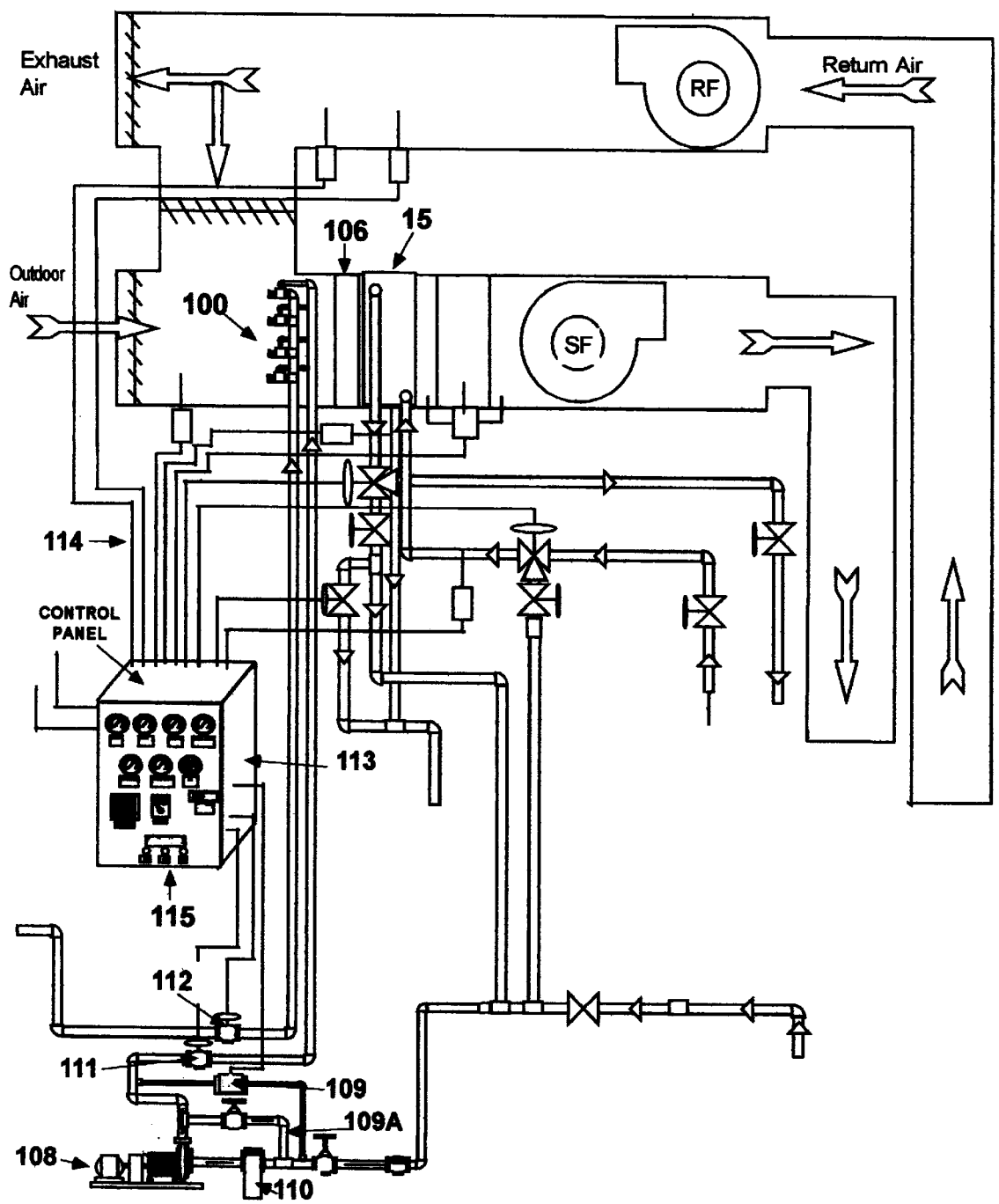
FIG. 5 is a schematic drawing showing pneumatic controls of the indoor air quality controlled foggers.

FIG. 5 illustrates a pneumatic control system as one way to control the indoor air quality controlled fogger system. As shown in the schematic, a booster pump (108) is supplied to increase water pressure when needed to supply the fogger array (100) with the proper water pressure. A differential pressure switch (109) is installed across the discharge side and the suction side of the booster pump (109A) signal the alarm circuit of the control panel when the booster pump (108) fails. A water filter system (110) is added onto the city water line to add an extra protection to the foggers (100). A water control valve (111) and a compressed air control valve (112) are both modulated to deliver the perfect fog ball.

An EMS (energy monitoring system) (113) with controllers, relays and others inside the panel is supplied with gauges, alarm lights and on/off switches on the outside panel face (115). The control tubing (114), which in most installations is ¼" copper tube, is distributed to the sensors, valves and other control devices. The energy monitoring systems (113) is in most cases a nema 1 panel housing regulators, controllers, fail safe interlocks and alarm annunciator. The outside panel face (115) or front cover displays the operating status of the indoor air quality controlled fogger incorporated into an existing heating, ventilation and air conditioning system.

Control Components

While control components may be classified in several ways, the indoor air quality controlled fogger groups components by their function within a complete control system. The first that is considered is the controlled device or final control element, examples of which are relays, valves, dampers and variable speed drives for fans. Actuators, which are used to drive the valve or damper, are also covered. The next consideration is the sensing element that measures changes in the controlled variable. Examples of sensing devices include temperature sensors, humidity sensors, water and air pressure, water and air differential pressure, water and airflow rates. While many other kinds of special sensors are available, the above mention represents the majority of those found in the indoor air quality controlled fogger control system. The third consideration, various types of controllers are reviewed. Controllers are classified according to the control action of the cause to maintain the desired condition (set point) whether they are two position, floating control, proportional control, proportional plus integral control, or proportional plus integral plus derivative control. In addition, this also describes the various techniques available for making the control decision in a modulating control system, such as pneumatic or digital controllers.

The controlled device is most frequently used to regulate or vary the flow of vapour (steam), liquid (water) or air within a heating, ventilation, air conditioning system. Liquid and vapour flow regulators are known as valves, and airflow control devices are called damper and variable speed drives. Both types perform essentially the same function and must be properly sized and selected for every indoor air quality controlled fogger application. The control system link to the valve or damper is a component referred to as an operator, or actuator. This device uses electricity, compressed air, or hydraulic fluid to power the motion of the valve stem or damper linkage, or the frequency wave form of a speed drive through its operating range.

Valves

Valves or an automatic valve is designed to control the flow of vapour (steam), liquid (water), gas (air) and other fluids and may be considered as a variable orifice positioned by an electric or pneumatic operator in response to impulses or signals from this controller. It may be equipped with a throttling plug or v-port specially designed to provide desired flow characteristics. Various types of automatic valves include:

double-seated valves three-way mixing valves three-way diverting valves butterfly valves.

Valve operators are of the following (1) a solenoid consisting of a magnetic coil operating a movable plunger; (2) an electric motor operating the valve steam through a gear train and linkage; (3) a pneumatic operator consisting of a spring-opposed, flexible diaphragm or bellows attached to the valve steam; (4) springless pneumatic operators, using two opposed diaphragms or two sides of a single diaphragm, are also used, but are generally limited to special applications involving large valves or high pressures.

Dampers

Automatic dampers are used in air-conditioning and ventilation systems to control air flow They may be used for modulating control to maintain a controlled variable such as mixed air temperature or supply air duct static pressure. Two types of damper arrangements re used for air-handling system flow control: (1) parallel blade dampers which are adequate for two-position control and can be used for modulating control when they are the primary source of system drop; (2) opposed blade dampers are preferable, since they normally provide better control.

Sensors

A sensor is the component in the control system that measures a value of the controlled variable. A change in the controlled variable produces a change in some physical or electrical property of the primary sensing element, which is then available for translation or amplification by mechanical or electrical signal. When the sensor uses a conversion from one form of energy (mechanical or thermal) to another (electrical), the device is known as a transducer. In some cases, the sensing element is a transducer, such as a terminator in which a change in electrical resistance occurs as a direct result of a change in temperature. The sensors for the indoor air quality controlled fogger must be capable of providing an identical and significant change in its output signal over the expected operating range. This sensor must have a compatibility of the controller input, set-point accuracy and consistency, system response time (or process dynamics), control agent properties band characteristics, and ambient environmental characteristics.

Controllers

Controllers take the sensor effect, compare it with the desired control condition (set point) and regulate an output signal to cause a control action on the controlled device. The controller and sensor can be combined in a single instrument, such as a room thermostat, or they may be two separate devices. When separate pneumatic units are used, the pneumatic controller is usually referred to as a receiver controller.

Pneumatic Receiver Controller

Pneumatic receiver controllers are normally combined with sensing elements with a force or position output to obtain a variable air pressure output. The control mode is usually proportional, but other modes such as proportional-integral can be used. These controllers are generally classified as non relay, relay direct or reverse acting.

Direct Digital Controllers

A direct digital controller uses a digital computer (such as a microprocessor or microcomputer) to implement control algorithm on one or multiple controllers in that the control algorithm is stored as a set program instructions in memory (software and firmware). The controller itself calculates the proper control signals digitally rather than using an analogue circuit or mechanical change.

A digital controller can be either a single or multi loop controller. Interface hardware allows the digital computer to process signals from various input devices such as electronic temperature, humidity or pressure sensors described earlier. Based on digitized equivalents of the voltage or current signals product by the inputs, the control software calculates the required state of the output devices, such as valves, dampers and low limits. The control algorithm stores in the computer's memory in conjunction with actual input valves enable the control decisions. The computer scans the input devices, executes the control algorithm, then positions the output device in a time-multiplex scheme. Digital controllers can be classified with regards to the way the control algorithms are stored in memory.

Figure 6:
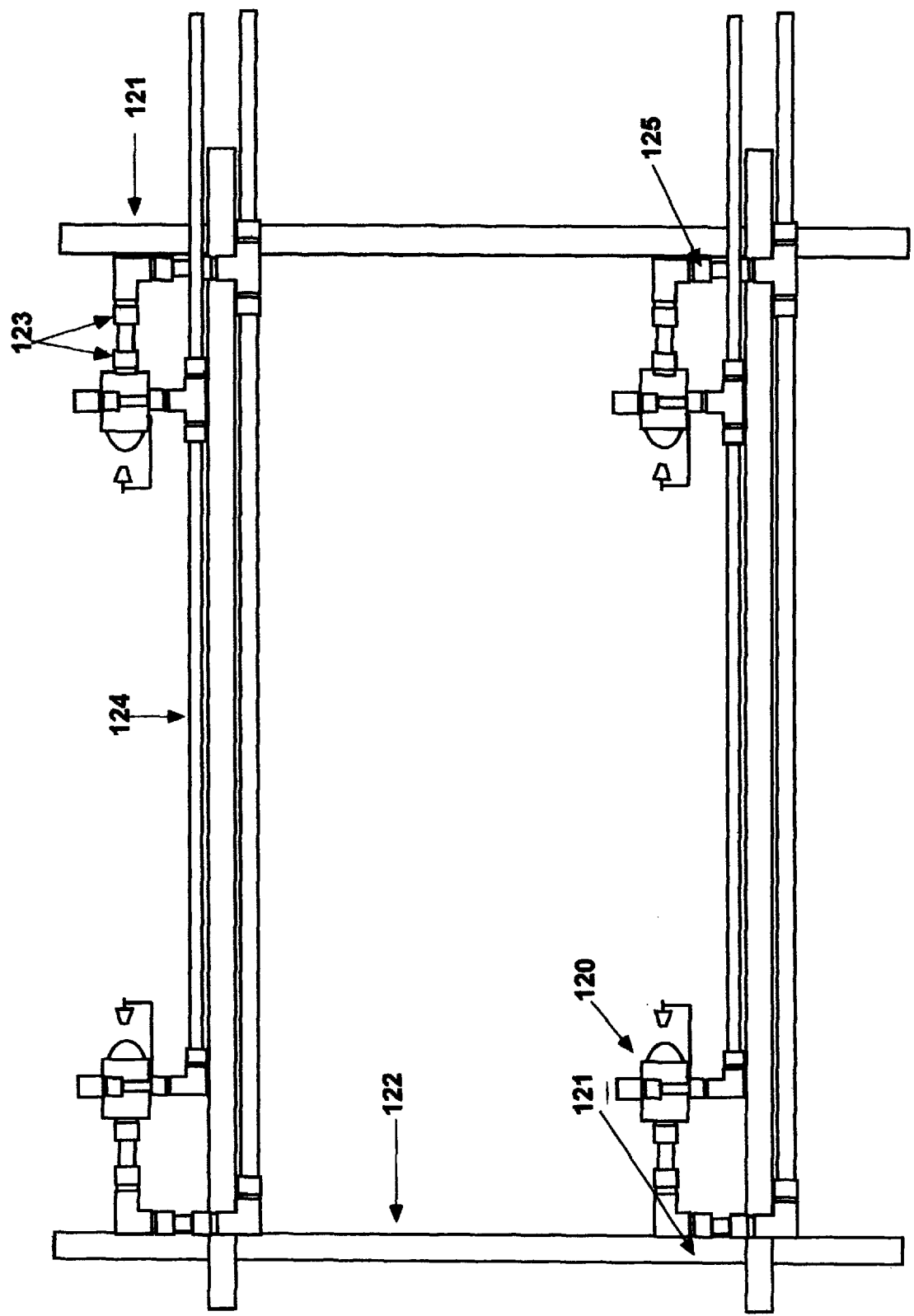
FIG. 6 is an end view of installed foggers.
Figure 7:
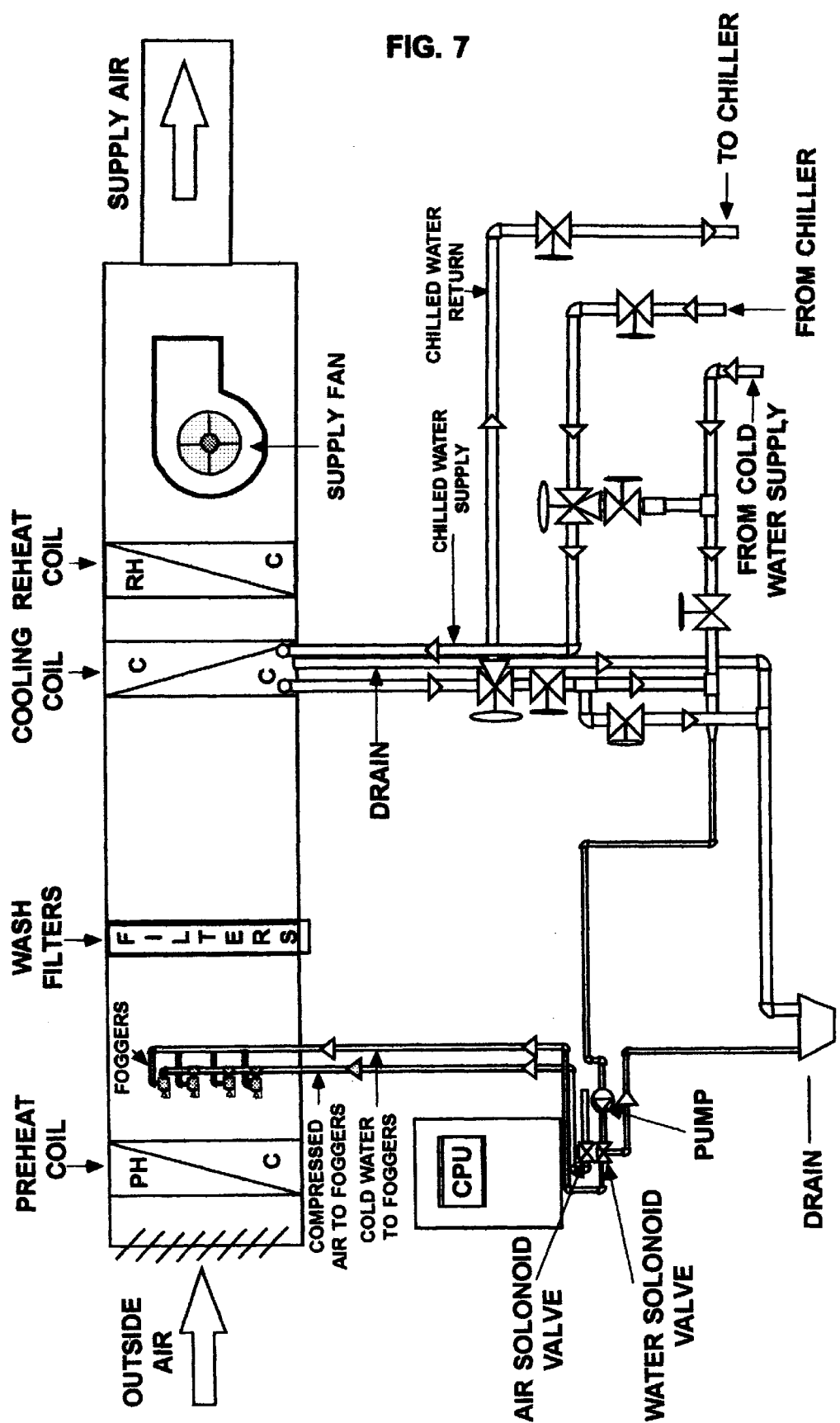
FIG. 7 is a schematic drawing of the invention as used with a 100% fresh air heating ventilating air conditioning unit.
Figure 8:
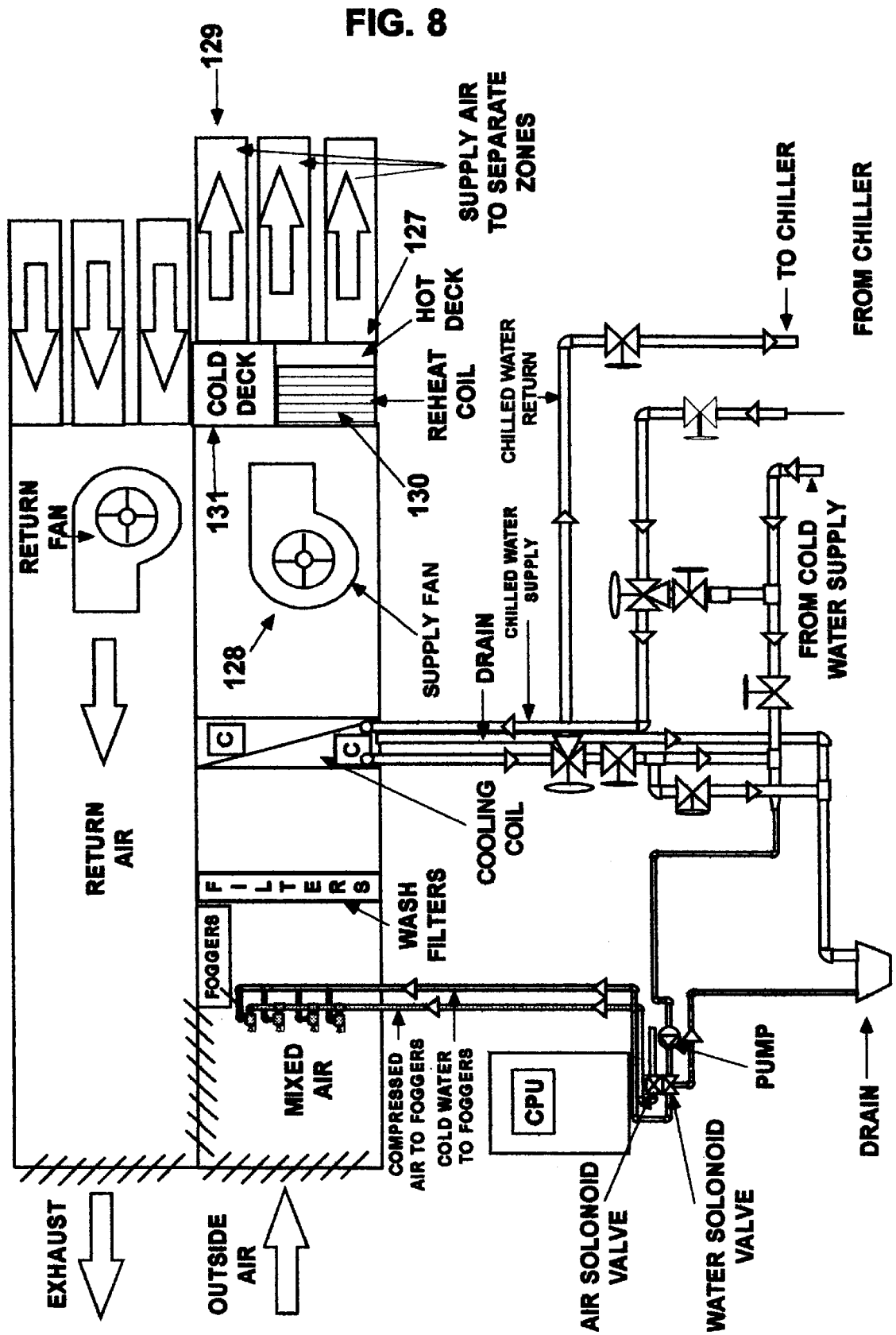
FIG. 8 is a schematic drawing showing the indoor air quality controlled fogger applied to a multizone heating ventilating air conditioning unit.
Figure 9:
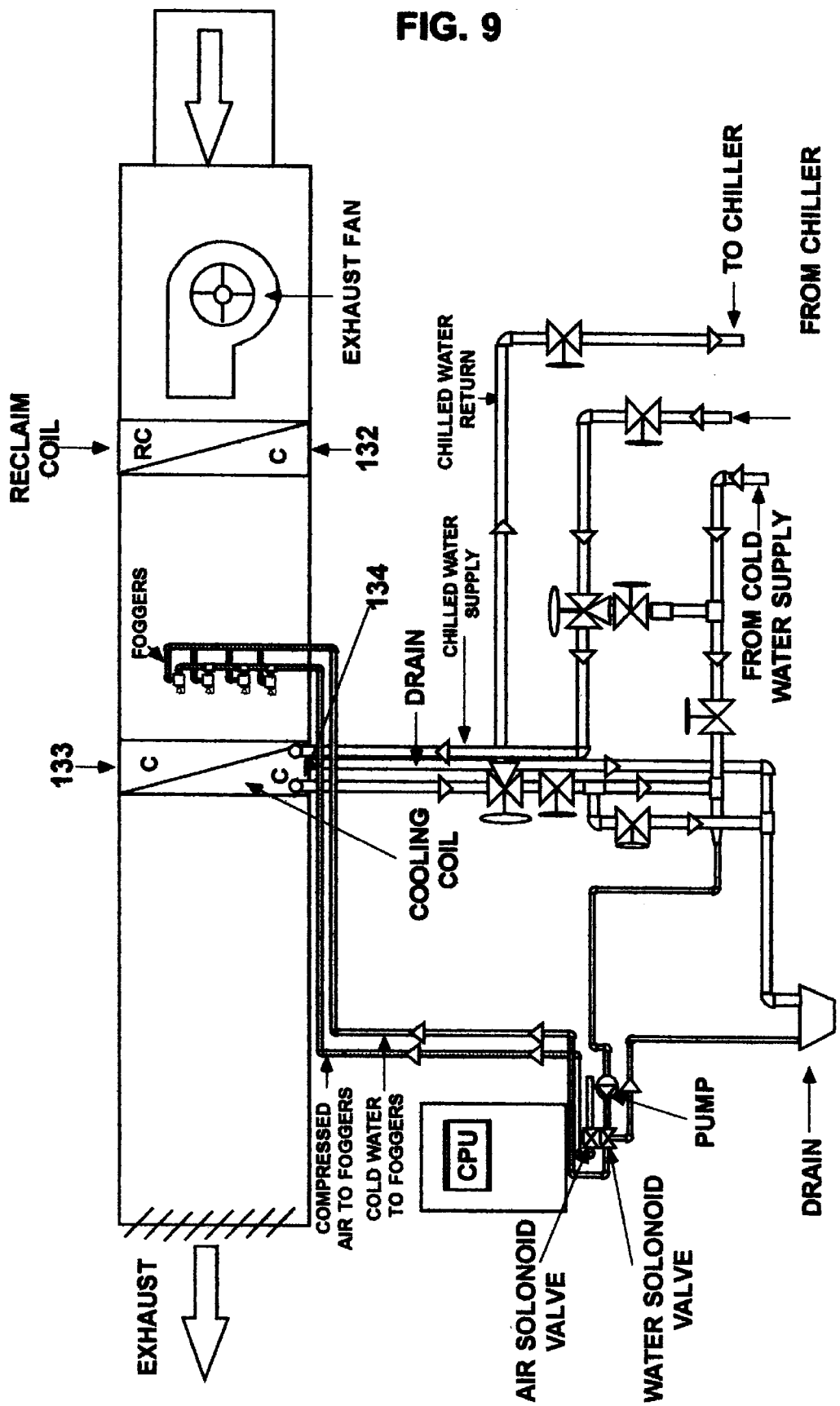
FIG. 9 is a schematic drawing showing the indoor air quality controlled fogger used in association with a laboratory exhaust unit.

FIG. 6 illustrates the fogger assembly on a typical application where the fogger (120) is mounted on a bracket (121) to assure that the fog stream is cross flow to the mixed-air stream. Uni-strut (122) is used to build a H frame to support all the foggers, piping and fittings. Brass fittings (123) are fitted with compression nuts (125) for air and water tight seal which is tied into copper tubing to serve the foggers with air and water. Copper tubing (124) is used to transport water in one line (¼") and air in the other line (⅜") to the foggers.

FIG. 7 illustrates a 100% fresh air heating, ventilation and air conditioning system with the indoor air quality controlled foggers incorporated within the system design parameters. The simplest form of all air systems is a 100% fresh air conditioner serving a single temperature control zone. The unit may be installed either with or without distributing ductwork. Ideally, we can provide a system which is completely responsive to the needs of the space.

The indoor air quality controlled fogger is easily installed into the existing unit to assist in the removal of outside pollutants as well as dust.

These types of units are usually found on roofs supplying small commercial offices, retail stores and apartments. Since control is directly from space, temperature and humidity, close regulation of the system conditions may be achieved. One hundred (100%) fresh air heating, ventilation and air conditioning units without reheat offer cooling flexibility but cannot control summer humidity independent of temperature requirements.

FIG. 8 illustrates a multizone heating, ventilation and air conditioning system with the indoor air quality controlled fogger installed in the mixing box (126) to eliminate volatile organic compounds and dust (particulate). The multizone system is applicable to service a relatively small number of zones from a single central air handling unit. The requirements of the different zones are met by mixing cold and warm air (hot deck, cold deck) through zone dampers (127) at the central air handler (128) in response to zone thermostats. The mixed treated conditioned air is distributed throughout the building by a system of single zone ducts (129). The most common multizone configuration reveals the physical differences between the multizone and dual-duct systems, with the zone mixing dampers (127) generally distributed horizontally along the hot and cold deck discharge plenums (130) and (131) of the air handler (128).

Multizone packaged equipment using direct expansion cooling coils, hot gas, electric or direct fuel-fired hot deck exchangers generally have step-controls for hot and cold deck capacity, which may substantially limit the quality of temperature and humidity control unless specific control provisions reincorporated into the system such as the indoor air quality controlled fogger.

FIG. 9 illustrates a typical laboratory exhaust with the indoor air quality controlled fogger incorporated into the system for the elimination of various pollutants. Energy considerations lend themselves to the application of run-around exhaust heat recovery coils (132) because of the need to clean lab exhaust for a very wide range of industrial contaminants which may be utilized within the lab modules. The indoor air quality controlled fogger is designed wherein exhaust air is blown through the heat recovery coil (132), a downstream fogging array or system, and fogs the contaminant exhaust stream to capture the pollutants in the 10 micron diameter water droplets. The saturated air blows through a cooling/condensing coil (133) where the pollutants are condensed in the cooling coil (133) then run to drain (134). The new clean exhaust stream is discharged to the outside air.

Scrubbing experience for the broad gamma of expected contaminants has led us to repeat the indoor air quality controlled fogger practice with the same application of wet film condenser coil scrubbing equipment.

What is claimed is:

1. A fogger array, permanent wash down filters, and a digital controller for use in treating mixed exhaust air and outdoor air, outdoor air or exhaust air, characterized by locating the fogger array proximate the point of entry of mixed exhaust air and outdoor air or outdoor air or near the point of exit of exhaust air, permanent wash down filters located downstream of the fogger array proximate the fogger array, the digital controller controlling the sensors and controls to the incoming mixed exhaust air and outdoor air, outdoor air or exhaust air and the fogger array.

* * * * *